March 12, 1935. R. E. NAGEL 1,994,252
AUTOMATIC LIQUID LEVEL CONTROL
Filed Nov. 28, 1930
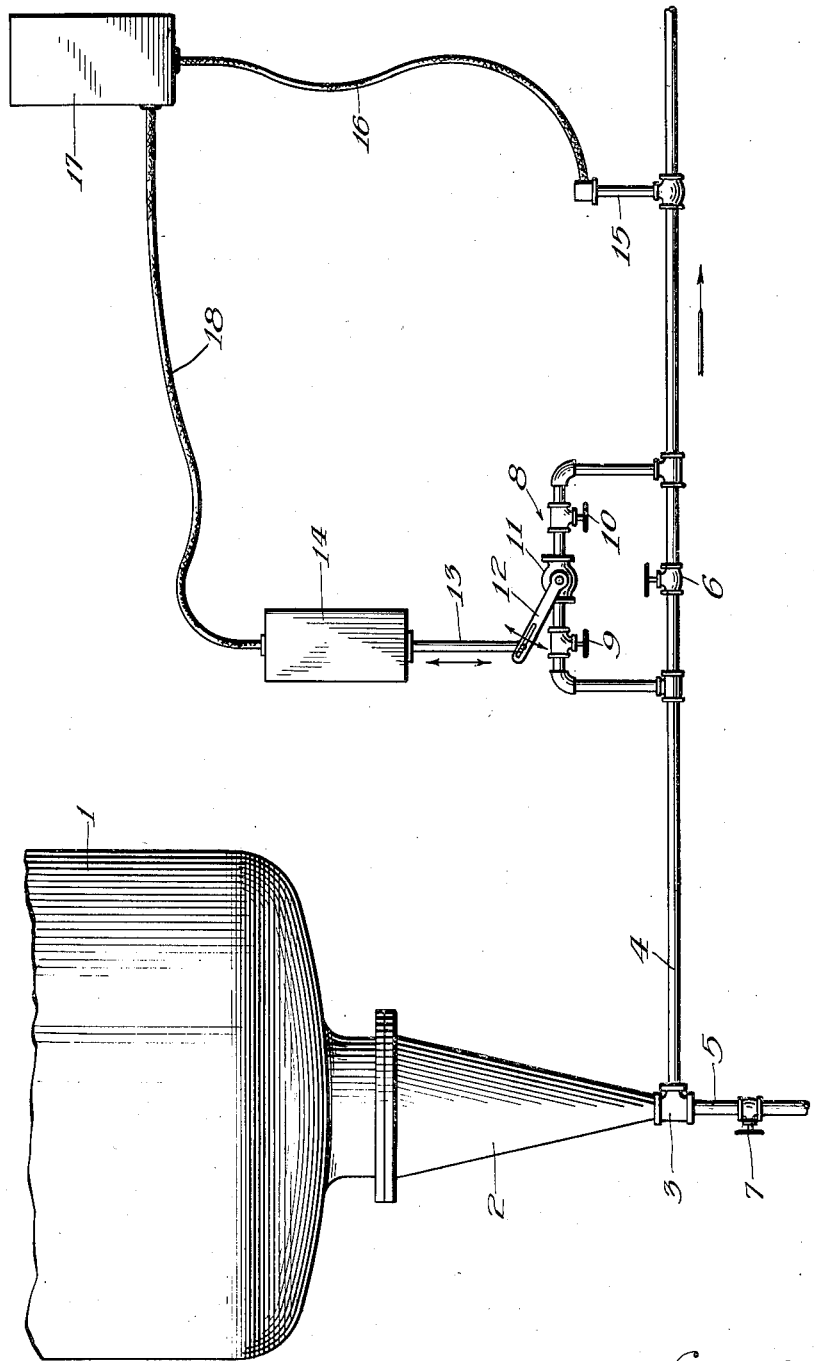
Witness:
Stephen F. Rebora
Inventor.
Robert E. Nagel,
By Frank L. Belknap
Atty.

UNITED STATES PATENT OFFICE 1,994,252

AUTOMATIC LIQUID LEVEL CONTROL

Robert E. Nagel, Chicago, Ill., assignor to Universal Oil Products Company, Chicago, Ill., a corporation of South Dakota Application November 28, 1930, Serial No. 498,770

1 Claim. (Cl. 196—132)

This invention relates to an improved method and means for automatically controlling the level of liquid within a vessel, and relates more particularly to a liquid level control means actuated by variations in the temperature of the material passing from said vessel.

In one specific embodiment of the invention, it is applicable to the control of the level of liquid within a chamber in an oil cracking process, and is particularly advantageous in cracking operations wherein a low or substantially no liquid level is maintained within a chamber.

Other and further objects of the invention will be apparent from the following description.

Referring to the drawing, 1 is a chamber of any conventional type within which a liquid (not shown), the level of which is to be controlled, may be retained. Disposed at the lower end of chamber 1, and through which liquid may pass, is a conical outlet 2, having a T-coupling or other desired union 3, threaded to draw-off pipes 4 and 5, which are controlled by suitable valves 6 and 7, respectively. Interposed in draw-off line 4, and adapted to shunt valve 6, is a by-pass 8, having manual control valves 9 and 10. Intermediate said control valves 9 and 10 and interposed on said by-pass 8 is an electro-responsive or other like valve 11 adapted to actuate upon movement of a suitable lever 12 attached to an energizing plunger 13 movably positioned within a solenoid or other motivating means 14. To control movement of the plunger 13 and consequent actuation of the lever 12 and valve 11, I may provide a thermo-couple or other temperature-responsive means 15, adapted to be interposed in said draw-off line 4, communicating through a line 16 with a potentiometer, vacuum tube member or other current relaying device 17, which in turn communicates through a line 18 with the solenoid member 14.

The potentiometer circuit may be adjusted to permit actuation of the solenoid or other motivating device to regulate the valve 11 for any desired change in temperature of the fluids leaving the vessel or chamber 1. For example, it may be determined that with the normal desired level of liquid within said chamber, the temperature of the stream of liquid leaving said chamber will not exceed substantially 825° F., whereas, when the level of liquid within the chamber is lowered, the temperature may gradually increase to as high as 875° F., or thereabouts. With this predetermined information, the potentiometer circuit may be adjusted to permit the valve 11 to remain fully open at temperatures below, say, 800° F., to gradually close as the temperature increases, say, from 815 to 835° F., and to maintain the valve in closed position at temperatures, say, above about 835° F.

Heretofore, attempts have been made to effect a control of the liquid level within a reaction chamber in an oil cracking process by means of a manual control valve on the residual draw-off. Due to a "coking up" or stoppage of said valve, a consequent lower amount of flashed vapors would be taken off of said residual products, and a transfer temperature variation of about 40° or 50°, more or less would result. Upon this variation being noted by the operator, the control valve would be flushed to remove the coke or carbon deposit in said valve, after which it would be set back at the desired opening. However, due to the above transfer temperature variation, together with the time element intervening before being noted by the operator, less residual products would be produced, allowing more flashed vapors to flash off in the flash chamber, causing said transfer temperature to be lowered. This would result in more residual products being produced, causing the liquid level in the chamber to rise, when the valve would again "coke-up", continuing the unbalanced operation. I have found that this variation and unbalanced operation may be eliminated, the liquid level kept constant, and an even, balanced operation maintained by means of the automatic control which I effect thereover.

As an example of an operation employing my invention, liquid is supplied by suitable means (not shown) to chamber 1 at substantially constant temperature and rate and liquid is withdrawn from chamber 1 through conical outlet 2 and line 4. Valve 6 on said line 4 is opened, and valves 9 and 10 on by-pass 8 are closed. Flow of liquid is permitted in this manner until the desired temperature is reached, a steady flow maintained and a substantially constant level had in said chamber. Potentiometer 17 is set in accordance with this temperature, valve 6 is closed and valves 9 and 10 opened, permitting liquid to flow through by-pass 8 and automatic valve 11 and the operation continued in this manner, effecting the regulation desired. As the operation continues, and in event of any coking or clogging of the automatic valve 11, the temperature of draw-off line 4 will drop, acting immediately on the potentiometer 17 through thermocouple 15, and eventually causing actuation of the valve 11 to cause a wider opening thereof, resulting in a washing out of the clogging matter.

After a return to normal temperature on the line 4, the valve 11 will be returned to its normal open position and the balanced operation desired is effected.

I claim as my invention:—

A process for controlling the liquid level maintained in a reaction chamber of a cracking process of the character in which oil at a cracking temperature is continuously admitted to the reaction chamber and residual oil continuously withdrawn from said chamber, comprising varying the rate at which residual oil is withdrawn from said chamber independently of the rate of introduction of oil into said chamber, in response to variations in temperature of residual oil that has been withdrawn from said chamber.

ROBERT E. NAGEL.